United States Patent
Straub

(10) Patent No.: US 6,675,085 B2
(45) Date of Patent: Jan. 6, 2004

(54) METHOD AND APPARATUS FOR STORING, ACCESSING, GENERATING AND USING INFORMATION ABOUT SPEED LIMITS AND SPEED TRAPS

(76) Inventor: Michael P. Straub, 240 Swimming River Rd., Colts Neck, NJ (US) 07722

( * ) Notice: Subject to any disclaimer, the term of this patent is extended or adjusted under 35 U.S.C. 154(b) by 0 days.

(21) Appl. No.: 09/932,115

(22) Filed: Aug. 16, 2001

(65) Prior Publication Data

US 2002/0022920 A1 Feb. 21, 2002

Related U.S. Application Data

(60) Provisional application No. 60/225,901, filed on Aug. 17, 2000.

(51) Int. Cl.$^7$ .............................. G06F 7/00; G05D 1/00; B60T 8/32
(52) U.S. Cl. ........................ 701/93; 701/119; 340/905; 180/170
(58) Field of Search .............................. 701/93, 117, 94, 701/207, 208, 213, 95, 119; 180/170, 167, 168; 340/905, 901, 902, 907, 929, 936; 123/351; 342/357.13, 357.17

(56) References Cited

U.S. PATENT DOCUMENTS

| | | | | |
|---|---|---|---|---|
| 5,315,295 A | * | 5/1994 | Fujii | 180/167 |
| 5,428,544 A | * | 6/1995 | Shyu | 701/117 |
| 5,485,161 A | * | 1/1996 | Vaughn | 342/357.13 |
| 5,546,311 A | * | 8/1996 | Sekine | 340/902 |
| 5,808,565 A | * | 9/1998 | Matta et al. | 340/994 |
| 5,819,198 A | * | 10/1998 | Peretz | 340/905 |
| 5,844,505 A | * | 12/1998 | Van Ryzin | 340/905 |
| 5,952,941 A | * | 9/1999 | Mardirossian | 340/539 |
| 6,008,740 A | * | 12/1999 | Hopkins | 340/905 |
| 6,016,458 A | * | 1/2000 | Robinson et al. | 235/492 |
| 6,118,403 A | * | 9/2000 | Lang | 342/20 |
| 6,133,856 A | * | 10/2000 | Mc Cauley | 340/902 |
| 6,134,489 A | * | 10/2000 | Smedley | 123/349 |
| 6,161,072 A | * | 12/2000 | Clapper | 180/170 |
| 6,246,948 B1 | * | 6/2001 | Thakker | 123/351 |
| 6,265,989 B1 | * | 7/2001 | Taylor | 340/539 |
| 6,356,833 B2 | * | 3/2002 | Jeon | 180/167 |
| 6,388,578 B1 | * | 5/2002 | Fagan et al. | 340/901 |
| 6,400,304 B1 | * | 6/2002 | Chubbs, III | 342/104 |

FOREIGN PATENT DOCUMENTS

GB 2334700 A * 9/1999 .......... B60K/31/00

* cited by examiner

*Primary Examiner*—Jacques H. Louis-Jacques
(74) *Attorney, Agent, or Firm*—Straub & Pokotylo; Michael P. Straub

(57) ABSTRACT

Methods and apparatus for storing, accessing, generating and using information about speed limits and speed traps are described. The system includes a positional sensor such as a GPS device. Position information is used to access a database of speed limit and/or speed trap information. The database may be local or remote. Access to a remote database may be achieved using a wireless communications device such as a wireless (cellular) modem. Encountered speed traps are logged in response to the activation of a speed trap alert button by a user of the device or the output of a radar/laser detector. Speed trap position, date and time information is transmitted to the remote database system. Speed limit information is used to control the speed of the automobile as part of a cruise control operation and/or is used to provide the motor vehicle operator with warnings, e.g., that the applicable speed limit is being exceeded. Speed trap information which is retrieved using positional information provided by the GPS device is used to warn the user of the device of speed traps in the user's vicinity as the user approaches the location of the known speed trap.

19 Claims, 4 Drawing Sheets

METHOD AND APPARATUS FOR STORING, ACCESSING, GENERATING AND USING INFORMATION ABOUT SPEED LIMITS AND SPEED TRAPS

RELATED APPLICATION

This application claims the benefit of the filing date of U.S. Provisional Patent Application Ser. No. 60/225,901, filed Aug. 17, 2000 which is hereby expressly incorporated by reference.

FIELD OF THE INVENTION

The present invention is directed to communications and information systems and, more particularly, to methods and apparatus for storing, accessing, generating and using information about speed limits and speed traps.

BACKGROUND OF THE INVENTION

Driving at speeds significantly below posted speed limits can reduce the risk of inadvertently exceeding a speed limit. However, slow driving can also create hazards associated with blocking traffic. For example, slow driving may encourage people to pass the slow moving vehicle which can be a risky undertaking on narrow, winding and/or poorly light roads.

While driving a motor vehicle, generally law abiding citizens attempting to drive at or near the speed limit will sometimes inadvertently exceed the legal speed limit. This may happen, for example, because of a sudden and poorly marked change in speed limits, because of a steep decline in the road surface such as may be encountered when descending a hill, or for other reasons.

Constant monitoring of a speedometer by a driver can be districting and lead to accidents due to the driver focusing his attention on the speedometer as opposed to road conditions. In addition, due to poor marking of speed limits, it is often difficult to promptly determine the applicable speed limit on any given road. This is particularly the case when turning onto a road. Thus, it is often difficult to comply with a speed limit simply because it is unknown to the driver.

To complicate matters, law enforcement officials seeking to issue speeding tickets and thereby generate revenue in the form of fines for local municipalities, often take advantage of naturally occurring road conditions and changes in speed limits, to find a location from which they can issue large number of speeding tickets. These tickets are often issued to unsuspecting motorists attempting to comply with the law.

While radar detectors offer some protection against speeding tickets, in many cases they fail to encourage compliance with speed limits. For this reason among others, radar detectors are illegal in some states.

In an attempt to make people aware of speed traps, at least one Internet web site, SPEEDTRAP.COM, lists speed trap location information. Unfortunately, this information may be incomplete, out-of-date, and/or difficult to access.

While the knowledge of speed trap location information can encourage motorists to comply with speed limits, particularly in locations where speed traps are known to occur, it is currently difficult for a motorist to access such information when needed, e.g., while driving. In addition, it is often difficult for the motorist to accurately identify the speed trap location based on the available position information which may be somewhat inaccurate.

In view of the above, there is a need for new and improved methods and apparatus for encouraging compliance with speed limits. In particular there is a need for methods and apparatus for providing a driver with speed limit information while driving. In addition, there is a need to provide a method of notifying the driver when he/she approximates or exceeds a speed limit. There is also a need for methods and apparatus for notifying a driver of upcoming speed trap locations. There is also a need for methods and apparatus for collecting accurate speed trap information, e.g., location and time information, and disseminating such information in a timely fashion to motor vehicle operators.

SUMMARY OF THE INVENTION

The present invention is directed to methods and apparatus for storing, accessing, generating and using information about speed limits and speed traps.

In accordance with the present invention, a motor vehicle is equipped with a positional sensor, e.g., a global positioning system (GPS) device. Based on positional information obtained from the GPS device, the position of the motor vehicle is determined and one or more databases including speed limit and/or speed trap information is accessed. Accessing of the databases may be done on an automated basis as the driver moves from geographic region to geographic region without requiring action by the driver.

The database(s) may be stored locally, e.g., internal to the digital driver assist (DDA) device of the present invention or remotely, e.g., at a physically remote information/service provider site, e.g., a site coupled to the DDA device via the Internet. Alternatively, the databases may be stored in a distributed fashion with the main portion of the database being stored locally and more recent, e.g., update information, stored remotely. Database access can be performed using a data link such as a wireless computer modem.

Since the database is accessed using the GPS provided positional information, a driver is provided information that is relevant to his current physical location in a timely manner making the information easy to use. The driver can be presented with the speed limit and/or speed trap information in an audio format in addition to a visual display. In this manner, a driver need not take his/her eyes off the road to access the information being provided.

Speed information can be supplied to the device of the present invention, e.g., from the output of a motor vehicles speedometer. Alternatively, based on changes in the positional information generated by the utilized GPS device, the speed of the motor vehicle can, and in some embodiments is, calculated by the device of the present invention.

In various embodiments the motor vehicle speed is compared to one or more speeds, e.g., speeds programmed by the user, which are determined relative to the lawful speed limit. For example, a user may program the device of the present invention to provide a first warning when the speed limit is being meet and a second warning when the speed limit is exceed by an amount, e.g., 5 or 10 miles, set by the user.

When cruise control is enabled, the device of the present invention can be used to maintain motor vehicle speed not at a fixed speed but at a speed set relative to the legal speed limit. For example, a driver may set the cruise control speed, e.g., at 2 miles below the speed limit or at the legal limit. As the driver moves from geographic region to geographic region, the system of the present invention adjusts the speed of the vehicle as a function of the appropriate local speed limit as indicated by the accessed speed limit database.

Wireless Internet access provides a convenient way in which to access a remote database of speed limit and/or speed trap information. Standard wired Internet access is also supported, e.g., for updating of stored database information prior to a trip. The exchange of information between the speed limit/speed trap information service provider, which is responsible for maintaining the information database or databases can be in the form of an E-mail message transmitted via the Internet. The E-mail message may include one or more attachments. In one such embodiment, the device of the present invention E-mails the speed limit/speed trap service provider, e.g., using a wireless modem, identifying the subscriber or subscriber device and providing current position information. Direction of motion information may also be provided in the E-mail message. The service provider responds by E-mailing to the device of the present invention speed limit and/or speed trap information relevant to the motor vehicle's current position and to the general vicinity of the current position.

The user of the service may subscribe on a monthly or other periodic basis to the information service provider. In this manner a stream of revenue can be collected from device users seeking to use the speed limit and/or speed trap information databases in accordance with the information service aspect of the present invention.

While speed limit information is readily available from public sources creating and maintaining an accurate database of speed trap information is a more complicated issue. Speed trap locations can vary based on time of day, day of week, day of month and season. In addition, since speed traps are based on the selection and preferences of particular law enforcement officers, individual speed traps may fall in and out of use as officers join and leave the police force.

In accordance with one feature of the present invention, the device of the present invention is provided with a button e.g., a speed trap alert (STA) button, that can be pressed when a speed trap is encountered. Pressing of the button causes a speed trap log to be created which includes position (GPS position data), time, and date information. In some embodiments, a radar and/or laser detector is included in the device. The output of the radar/laser detector is used to automatically create an event in the log when a speed measuring device is encountered. The automatically generated log entry may include time, date position information as in the case when the STA button is pressed. However, an automated log entry generated in response to the output or the radar/laser detector also includes information on the type of signal detected, e.g., the band of radar or laser light encountered. In this manner, speed trap information can automatically be gathered without the need for the user of the device to press the STA button. The radar/laser detector can also be used to provide the device user with an indication that an actual speed trap is being encountered.

The log of speed trap information created by the device of the present invention is supplied to the information service provider as part of a request for speed limit and/or speed trap information initiated by the device. Accordingly, the log may be transmitted as part of an E-mail message, e.g., in the form of an attached file, to the information service provider via the Internet.

Received log information is used by the Internet service provider to update the information in the speed trap database. As a result of these updates, the speed trap database may include information accurate to within a few minutes. In addition, patterns regarding speed trap occurrences can be detected by analyzing the speed trap information over a period of time. In this manner, different levels of speed trap warnings may be issued for a particular location based on, e.g., the time of day or the day of the week. Different audio sounds may be used to alert a customer to the different warning levels with, e.g., the loudest warning tone or sound being used to indicate a speed trap which was indicated to be active by another customer a short time prior to the current customer's speed trap check.

Speed traps corresponding to particular locations are, in one embodiment, deleted from the database as customer provided speed trap logs fail to indicate the use of the particular speed trap for extend periods of time, e.g., three months.

In some embodiments, warnings and/or speed limit information are provided to the user in the form of speech through the use of a text to speech device.

In addition to providing speed limit and/or speed trap information, the Information provider of the present invention, in some embodiments, provides traffic and/or accident information as well as news, e.g., weather reports, retrieved as a function of GPS position information supplied to the information service provider.

Various additional features and advantages of the present invention will be apparent from the detailed description which follows.

DETAILED DESCRIPTION

As discussed above, the present invention is directed to methods and apparatus for storing, accessing, generating and using information about speed limits, speed traps and/or other regional information.

Figure 1:
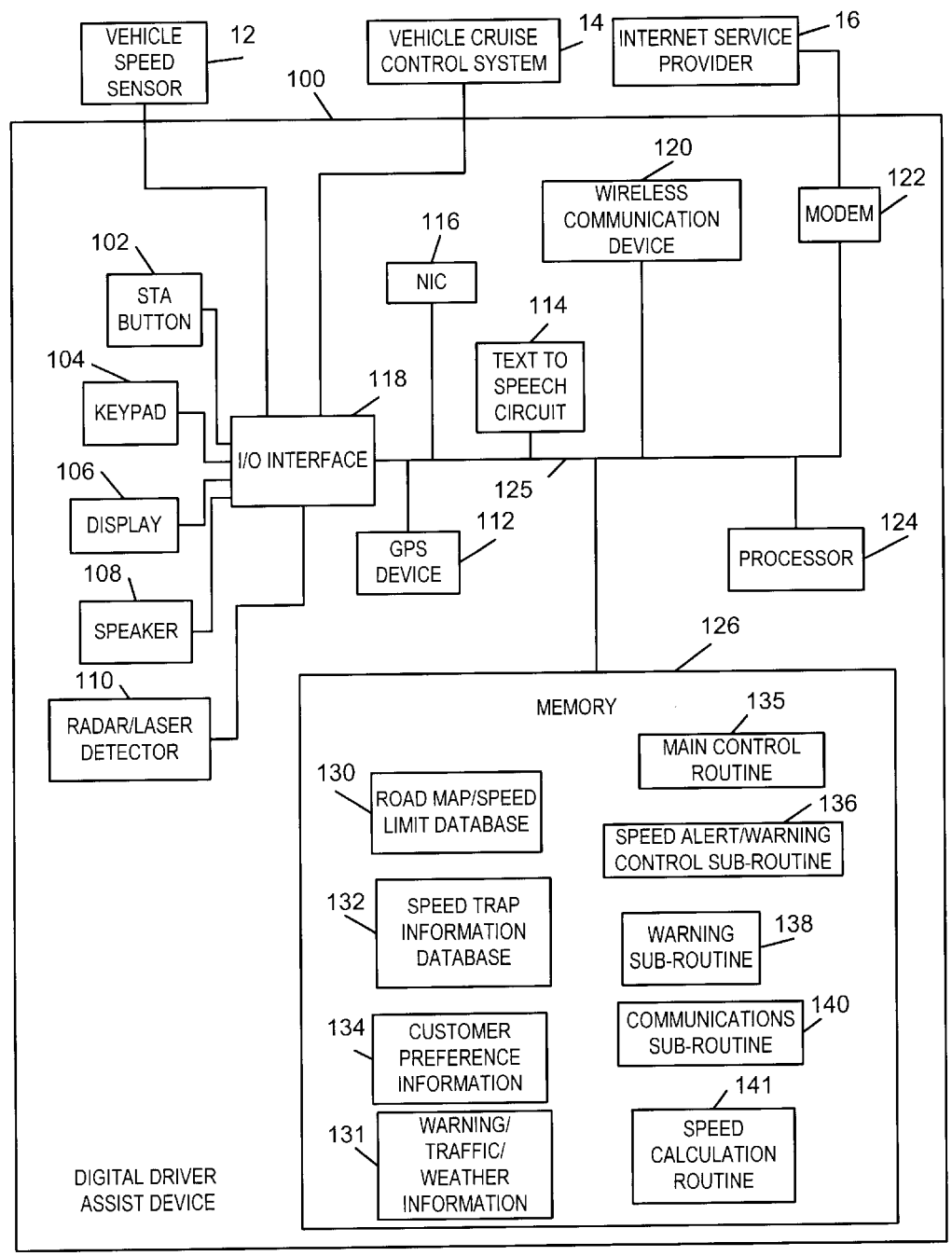
FIG. 1 illustrates a digital driver assist device implemented in accordance with the present invention.

FIG. 1 illustrates an apparatus, e.g., a digital driver assist device 100 implemented in accordance with the present invention. The device 100 is shown coupled to a vehicle speed sensor 12 and a vehicle cruise control system 14 both of which may be part of, e.g., an automobile, truck or other vehicle. The device 100 is also shown coupled to an Internet service provider 16 which allows the device 100 to receive and/or send information over the Internet. The connection to the Internet service provider 16 may be through a radio connection, e.g., a wireless connection, or through a wired connection, e.g., in the case where the device 100 is occasionally coupled via a telephone or other communications line. The device 100 may be implemented in the form of a portable device or integrated directly with a vehicle, e.g., mounted on or in a vehicles dashboard.

Because the device 100 can derive speed and position information from the output of a global positioning sensor 112, in cases where it is not used to control vehicle speed, the device 100 does not need to be linked to a vehicles cruise control system. This makes the device 100 particularly well suited from moving from vehicle to vehicle without the need for any wires connecting the device to the vehicle in which it is being used at any given time. The device 100 may be implemented as a handheld device, and/or integrated into another system such as a portable data assistant or notebook computer.

The device 100 comprises an input/output interface 118, global positioning system device 112, network interface card 116, text to speech circuit 114, wireless communication device 120, modem 122, processor 124 and memory 126 coupled together by bus 125. The I/O interface servers to connect the devices and circuits on the bus 125 to various external systems, input/output devices, etc.

In the FIG. 1 embodiment, I/O interface 118 coupled the devices and circuits on bus 125 to a speed trap alert (STA) button 102, keypad 104, display 106, speaker 108 and radar/laser detector 110. In addition, the interface 118 coupled the device's internal components to a vehicle speed sensor 12 and vehicle cruise control system 14.

STA button 102 is activated by a user in response to detecting a speed trap, e.g., visually or other wise, to provide information to the device which is used to update its database of speed trap information. Keypad 104 is used to enter user preference information, e.g., cruise control speed settings and vehicle speed settings at which the user wants to receive a speed alert notification. Display 106 can be implemented using a screen and/or LEDs. The display 106 is used to present relevant information to the user, e.g., map, position and/or speed limit information as well as to provide warnings and other notifications. Speaker 108 is used to provide audible warnings and alerts in the form of speech and/or other sounds. Radar/laser detector 110 is used to detect signals used by police and/or others to measure vehicle speed and to indicate the detection of such signals. The user is provided a warning by the detector 110 upon detection of such signals while the detector 110 also sends a signal to interface 118 which is used, in combination with date, time and position information, to update the speed trap information database 132.

Network interface card 116 provides a way of interfacing with communications networks, e.g., LANS, in order to update information in the memory 126. Wireless communication device 120 allows for wireless data updates and exchanges of information while modem 120 allows for wired exchanges of information, e.g., via the public telephone network.

Operation of the device 100 is controlled under the direction of various routines stored in the memory 126 which are executed by processor 124. The stored routines use data 130, 132, 134 also stored in the memory 126. The stored data includes a road map and/or speed limit database 130, speed trap information database 132, customer preference information 134, main control routine 135, speed alert/warning control sub-routine 136, warning sub-routine 138, communications sub-routine 140 and speech calculation routine 141.

The road map/speed limit data base 130 includes road map information and information on the speed limit associated with each portion of a road in the stored road map. Different devices may be preloaded with different databases 130 and the information in the database 130 may be updated periodically, e.g., while traveling via the wireless communication device and/or via wired connection via modem 122 when the device is not being moved. Downloading of relevant map information may, and in various embodiments does, occur automatically as the device is moved from location to location to insure that it has the relevant information for the area through which the device and vehicle are traveling. Speed trap information database 132 includes information on known speed traps and their geographic location. Database 132 is updated periodically in the same manner as database 130. In addition, the information in database 132 is updated to reflect speed traps detected via the activation of radar/laser detector 110 by a radar or laser signal and/or by the device user pressing STA button 102 to indicate a visually or otherwise detected speed trap. Database 132 may include information on the date, time and location of each known speech trap with the date and time information being arranged, in some embodiments, to form a schedule indicating when particular speed traps are known to be active or are likely to be active. In some embodiments, speed trap warnings are limited to speed traps which are known to be active or are likely to be active at the time the device user approaches the speech trap location.

Customer preference information 134 is used to store information on a user's preferences. A device user can set preference information such as a particular speed at which the user wants the device 100 to provide a warning. While fixed vehicle speeds may be set, e.g., 60 mph, as warning speeds, a user can also specify a speed relative to the legal speed limit. For example, a user can indicate that he/she wants to be notified when the legal speed limit is reached, and/or when it is exceed or not by a fixed amount. For example, a user can set a speed notification to be provided at 10 mph above the legal speed limit and/or at 5 mph below the speed limit. In one particular embodiment the set speed at which a notification is to be provided is stored in the customer preference information as an legal speed limit offset value. For example, in one embodiment a set speed of +10 miles per hour stored in information 134, will cause a speed warning to be provided when the speed limit is exceeded by 10 mph. A set speed of 0 results in a notification when the speed limit is reached while a set speed of −10 mph will result in a notification when the speed of the vehicle drops below the speed limit by 10 mph. The set speed feature is useful in helping a driver stay within a desired speed range relative to the legal speed limit. For example, by setting −5 mph and +5 mph an hour a driver will be notified when he exceeds the speed limit by 5 mph or more and will also be notified if the vehicle speed drops below the speed limit by 5 mph or more.

In accordance with the present invention, the device user can also set a cruise control speed relative to the legal speed limit. For example, a driver could set a cruise control speed at −5 mph resulting in the device 100, when coupled to the vehicle's cruise control system 14 maintaining the vehicle speed at 5 mph below the legal speed limit. Accordingly, as the vehicle controlled by the device 100 moves from one geographic region to another, the vehicle's speed would be modified to reflect changes in the legal speed limit.

The main control routine 135 is responsible for controlling the updating of various information 130, 132, 134 stored in the device 100 as well as for generating speed alerts, warning messages and for controlling device speed when the cruise control feature of the invention is enabled. The main control routine 135 can call various sub-routines including speed alert/warning control subroutine, warning sub-routine 138, communications subroutine 140 and speech calculation sub-routine 141. Warning sub-routine 138 is used to provide warning messages to the device user, e.g., traffic warnings, etc. It can control text to speech circuit 114 to provide audio messages as well as the display 106 to provide visual warnings. Communications sub-routine 140 can be used to control the transmission of messages and the receipt of information via the Internet. Speed calculation sub-routine is used to calculate device speed from positional information when input from vehicle speed sensor 12 is not available.

Figure 2:
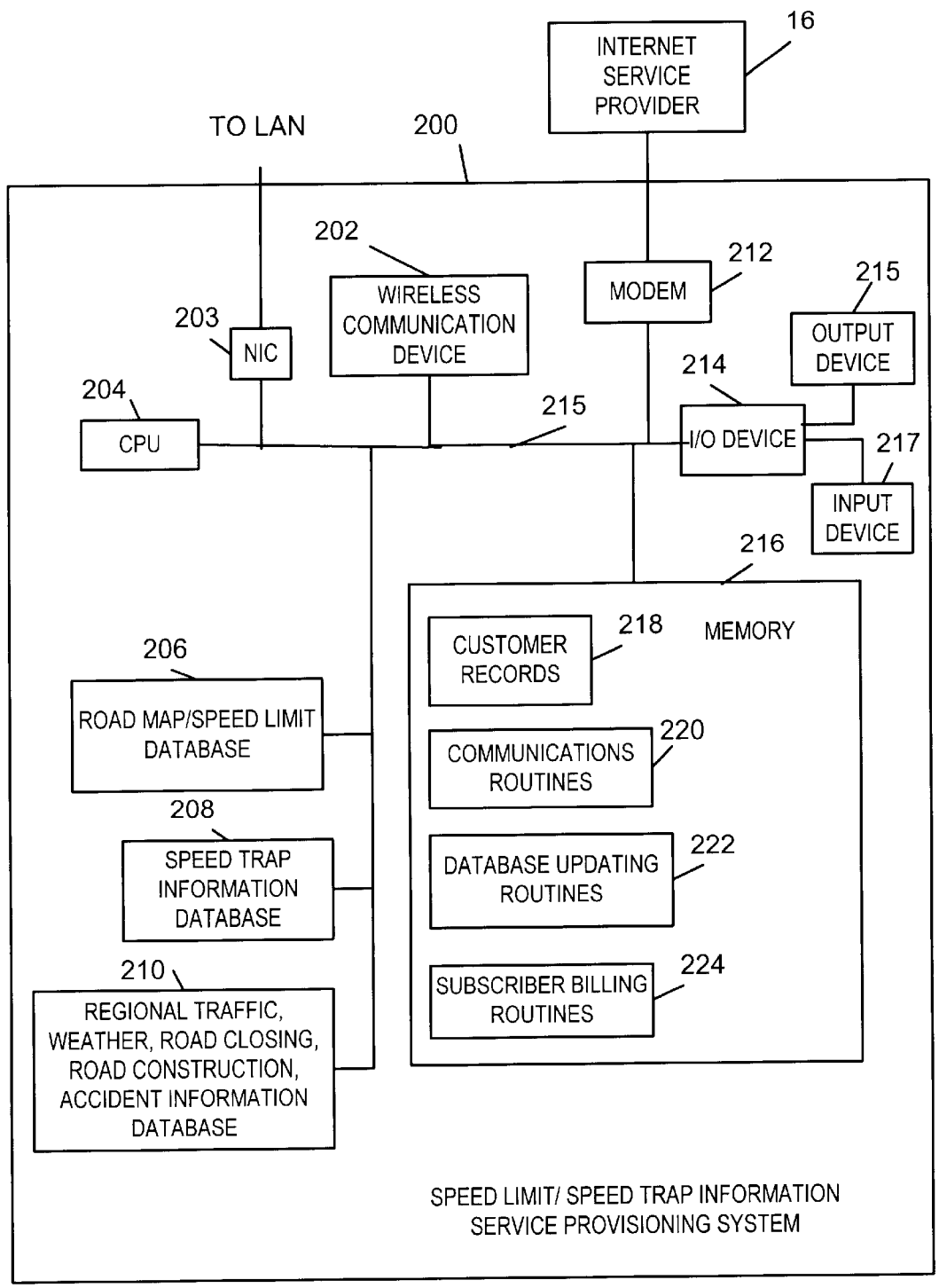
FIG. 2 illustrates a speed limit/speed trap information service provisioning system, e.g., facility, implemented in accordance with the present invention.

FIG. 2 illustrates a speed limit/speed trap information service provisioning system 200 which is coupled to the Internet via Internet service provider 16. The system 200 can be used to provide service subscribers having devices of the type illustrated in FIG. 1 with up to date road maps, speed limit information, speed trap information and relevant travel information including regional traffic information, weather, road closing information, road construction information, accident information, etc.

The system 200 comprises a central processing unit (CPU) 204, wireless communication device 202, modem 212, network interface card (NIC) 203, I/O device 214 road map/speed limit database 206, speed trap information database 208, regional traffic, weather, road closing, road constructions, accident information database 210 and memory 216 which are coupled together by bus 215.

The wireless communication device 202 allows the system 200 to serve as a base station for mobile devices 100, e.g., by transmitting signals to, and receiving signals from, the wireless communication device 120 included in each device 100. In this manner, devices 100 can request and receive updated maps, warning information, etc. as desired, e.g., at periodic intervals and/or as the devices 100 enter new geographic areas. In addition, messages informing the provisioning system 200 of detected speed traps can be received from the devices 100. Such messages include information identifying the location of the detected speed trap, as well as the time and date the speed trap was detected. Messages reporting detected speed traps may be grouped by a device 100 prior to transmission to the system 200 and, in some embodiments, are supplied to the system 200 at the same time, e.g., during the same communications session, in which the device 100 receives updated information, e.g., road map, speed limit, speed trap and/or other information from the system 200.

Modem 212 connects the provisioning system to the Internet via ISP 16 thereby allowing updates to be transmitted to devices 100 via the Interment and for messages, e.g., speed trap alert notification messages, to be received by the system 200 from devices 100. The I/O device couples the various system components such as the CPU 204 to an output device 215, e.g., display, and an input device 217, e.g., keyboard. In this manner, a system administrator can enter instructions, commands and/or other system control information and view the status of the system and the data stored therein.

While the various databases 206, 208, 210 are shown as being separate from the memory 216, they may be part of the memory, implemented as separate storage device such as hard disk drives and/or be implemented using external storage such as network storage which can be accessed via NIC 203.

The CPU 204 under control of various routines stored in memory 216 controls the operation of the system 200. Stored routines included a communications routine 220, database updating routines 222 subscriber billing routines 224. Memory 216 also includes subscriber records 218 which include information on customers, e.g., customer/device location information, information on when updates are to be sent to the service subscribers, etc. Communications routines 220 are used to control the transfer of information to and from the system 200. Database updating routines 222 control the updating of the various databases 206, 208, 210 based on received speed trap alert messages, warnings, weather and construction alerts received from news organizations, etc.

Road map/speed limit database 206 includes road map and speed limit information. It is updated periodically to reflect changes in speed limits and road changes. Speed trap information database 208 includes information on known speed traps including the time and days of the week particular speed traps are known to be active. It is updated based on received speed trap alert messages. It may be generated initially from publicly available information on issued speeding traffic tickets which frequently include information on the location, e.g., highway and position on the highway, where the ticket was issued. It may also be updated from known databases of such information.

In some embodiments, speed traps for which speed trap alert messages are not received for a period of time, e.g., 6 months, are deleted from the database 208 to avoid the database listing a large number of speed traps which are no longer in use.

Subscriber billing routines 224 are used to control subscriber billing. In one embodiment, the information in databases 206, 208, 210 is provided as a for fee service with customers paying a periodic subscription fee, e.g., monthly fee, for the right to access the databases and to receive updates as requested and/or at preset periodic intervals. In accordance with one feature of the present invention, in some embodiments subscribers who report speed traps by providing speed trap alert messages to the system 200 are provided a partial credit for contributing to the updating of the database 208. In one such embodiment, a small fixed amount, e.g., a few cents, is deducted up to a preset maximum credit amount each time a speed trap is reported via a speed trap alert message. Subscription fee bills are mailed periodically, e.g., monthly, and/or charged automatically to subscriber credit cards in accordance with the present invention.

Figure 3:
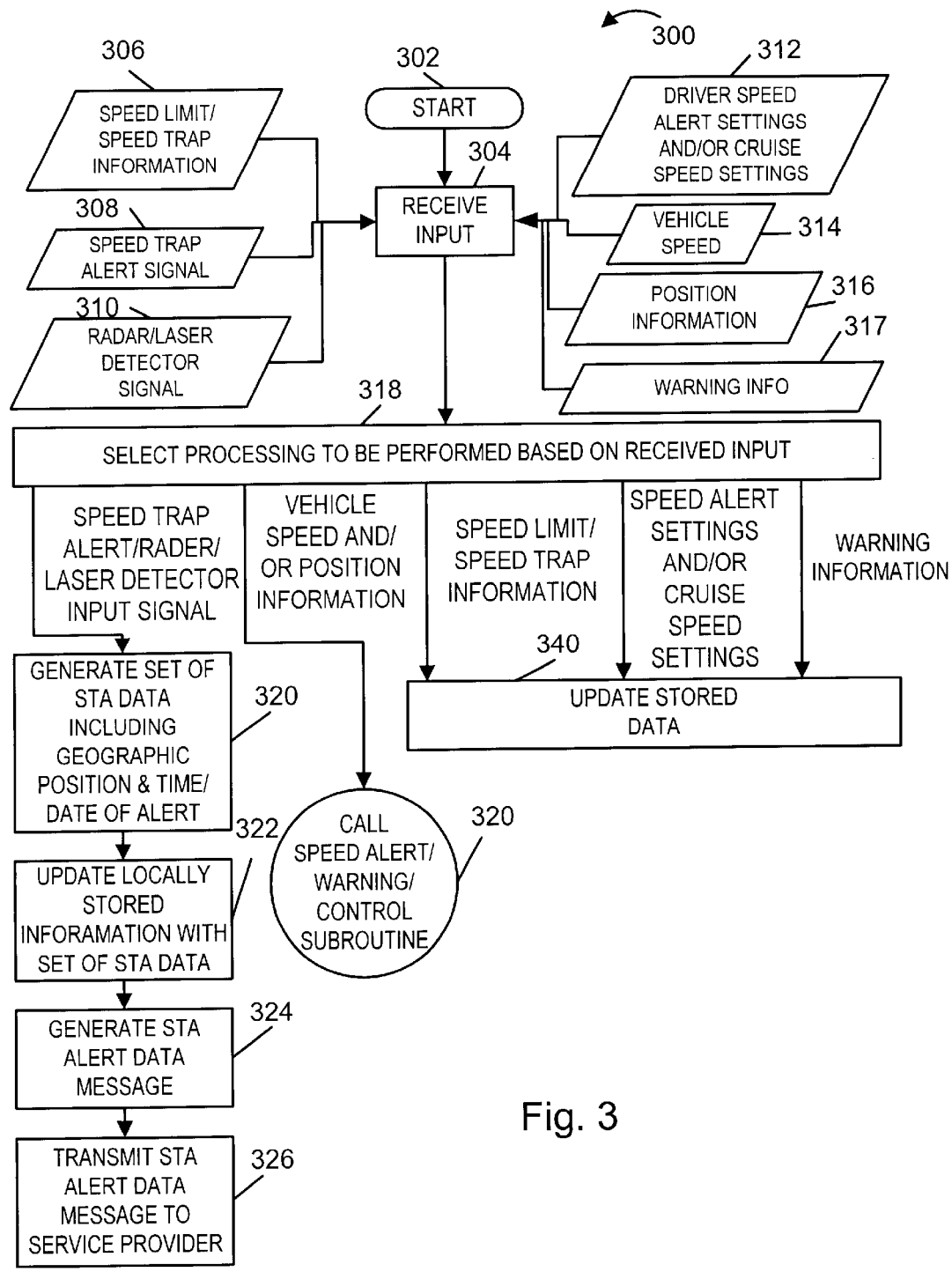
FIG. 3 illustrates the steps of a main control routine used to control the driver assist device of the invention illustrated in FIG. 1.

FIG. 3 illustrates the steps of a main control routine 300 used to control the driver assist device of the invention illustrated in FIG. 1.

The main control routine 300 starts in start step 302 when it is executed by the processor 124 of the device 100. Once executed, e.g., at device power-up, operation proceeds to a receive input step 304 which is performed at any point data, messages or other information is supplied to the device 100. In step 304, the device 100 is operated to receive input via any one of its various potential inputs, e.g., via wireless communication device 120, modem 122, NIC 116, keypad 104, STA button 102 and/or radar/lasar detector 110.

As illustrated in FIG. 3 potential inputs which can be received in step 304 include geographic speed limit information 306, a speed trap alert signal 308, a radar/laser detector signal 310, driver speed alert setting and/or cruise speed settings 312, vehicle speed information 314, vehicle or device position information 316 and warning information 317 which may include traffic weather and other information from service provisioning database 210.

When input is received in step 304, processing proceeds to step 318 which is a decision step which determines which processing branch should be taken depending on the type of received input. Step 318 may be implemented as a CASE statement or using other conditional logic.

If a speed trap alert signal or the signal from a radar/laser detector is received in step 304, operation proceeds to step 320 via step 318. In step 320 a set of speed trap alert data is compiled including geographic position information time and date information. The position information may be obtained from GPS device 112 while date and time information may be obtained from a clock implemented by processor 124. From step 320 operation proceeds to step 322 wherein the locally stored speed trap information database 132 is updated with the generated set of speed trap alert information. Then, in step 324 a speed trap alert data message, including the generated set of speed trap alert data, is created. Next, in step 326 the speed trap alert message is transmitted to the service provider 326, e.g., via wireless communications device 120, SO that the service provider can update the main speed trap information database 208. Operation along the processing path which starts with step 320 concludes with the transmission of the speed trap alert message in step 326.

If in step 305, speed limit information; speed alert settings and/or cruise speed settings; and/or warning information is received, operation proceeds via step 318 to step 340. In step 340, locally stored data 130, 132, 134 is updated, as appropriate, based on the received information. For example when speed trap and/or speed limit information is received, database 132 is updated to reflect the received information. Received user setting information is used to update database 134. Similarly, received warning information is used to update warning information database 131.

If in step 304, vehicle speed and/or position information was received, e.g., vehicle speed information from a vehicle's speed odometer or position information from GPS device 112, operation proceeds via step 318 to step 320. Step 320 is a CALL step which involves calling, e.g., executing the speed alert/warning/control sub-routine 400 shown in FIG. 4. Operation of the subroutine 400 will now be discussed in detail.

Sub-routine 400 beings in start step 402 when it is called by the main routine 300. Then, in step 404 the current applicable speed limit is determined by using current position information, obtained from GPS device 112, to retrieve the applicable speed limit from speed limit database 130.

Next, in step 406 a determination is made as to whether or not vehicle speed information is available, e.g., from a vehicles speed sensor 12.

If in step 406 it is determined that the vehicle speed in not available, operation proceeds to step 407 wherein the current speed of the device 100, and thus vehicle in which the device is located, is calculated from position information. This can be done by using speed calculation routine 141 to determine the speed from changes in the devices position, as indicated by sequential GPS outputs, over a period of time.

Operation proceeds directly from step 406 to step 408 when a vehicle's speed is available from the vehicle speed sensor 12 or to step 408 via step 407. Regardless of the path taken to step 408, the current vehicle speed (CVS) is known by the time step 408 is reached. In step 408, the current vehicle speed is compared to the speed alert settings entered by the user of the device 100. If the CVS equals a speed or is within a range of speeds for which the user has requested an alert notification operation proceeds to step 409 wherein a speed alert is provided to the system user. The alert may be in the form of a visual display, audio tone, or speed, e.g., an audible statement of the vehicle's speed. For example, if the user set the device to provide a notification of when the speed limit was reached or exceeded, the user would be notified upon step 408 determining that the current vehicle speed equaled or exceeded the legal speed limit. As discussed above, speed notification settings can be specified in terms of an offset from the legal speed limit. For example a user may set a notification at +5 to be notified when the speed limit equals or exceeds the CASL by 5 mph. In such a case, a determination would be made as follows current vehicle speed (CVS≧CASL+5?) if the output to the determination is true, a speed alert warning would be provided in step 409. Additional checks may be made to determine in step 408 if the CVS is below a set minimum speed, e.g., 5 mph below the speed limit. In such a case operation would proceed to step 409 if (CVS≦CASL−5).

Operation proceeds from notification step 409, to cruise control determination step 410. Alternatively, if the CVS did not trigger a speed warning in step 408, operation would proceed directly from step 408 to step 410.

In step 410 a check made to determine if the cruise control feature of the device 100 has been activated by the device user. If cruise control is not active operation proceeds directly to step 418. However, if cruise control is activated, operation proceeds to step 412.

In step 412 the current set vehicle speed is determined. As with the case of speed notifications, the cruise control speed is specified in accordance with the present invention relative to the legal speed limit. A user wishing to travel at the speed limit would set the speed to the speed limit. A user wishing travel 5 mph below the speed limit would specify a speed offset of −5 mph while a user wishing to control vehicle speed at 5 mph above the speed limit would set a speed offset of +5 mph. The current set vehicle speed (CSVL) is determined in step 412 by adding the CASL to the set speed which is stored in information 134 as an offset from the legal speed limit. Next, in step 414 the speed different (SD) is determined between the CVS and the CSVS. Then in step 416 the vehicle speed is adjusted to reduce any determined speed difference by sending one or more speed control signals to the vehicles cruise control system 14. Where the SD=0 no speed adjustments are made in step 416 since the difference is already at a minimum, i.e., there is no difference between the set and actual speed. Operation proceeds from step 416 to step 418.

Figure 4:
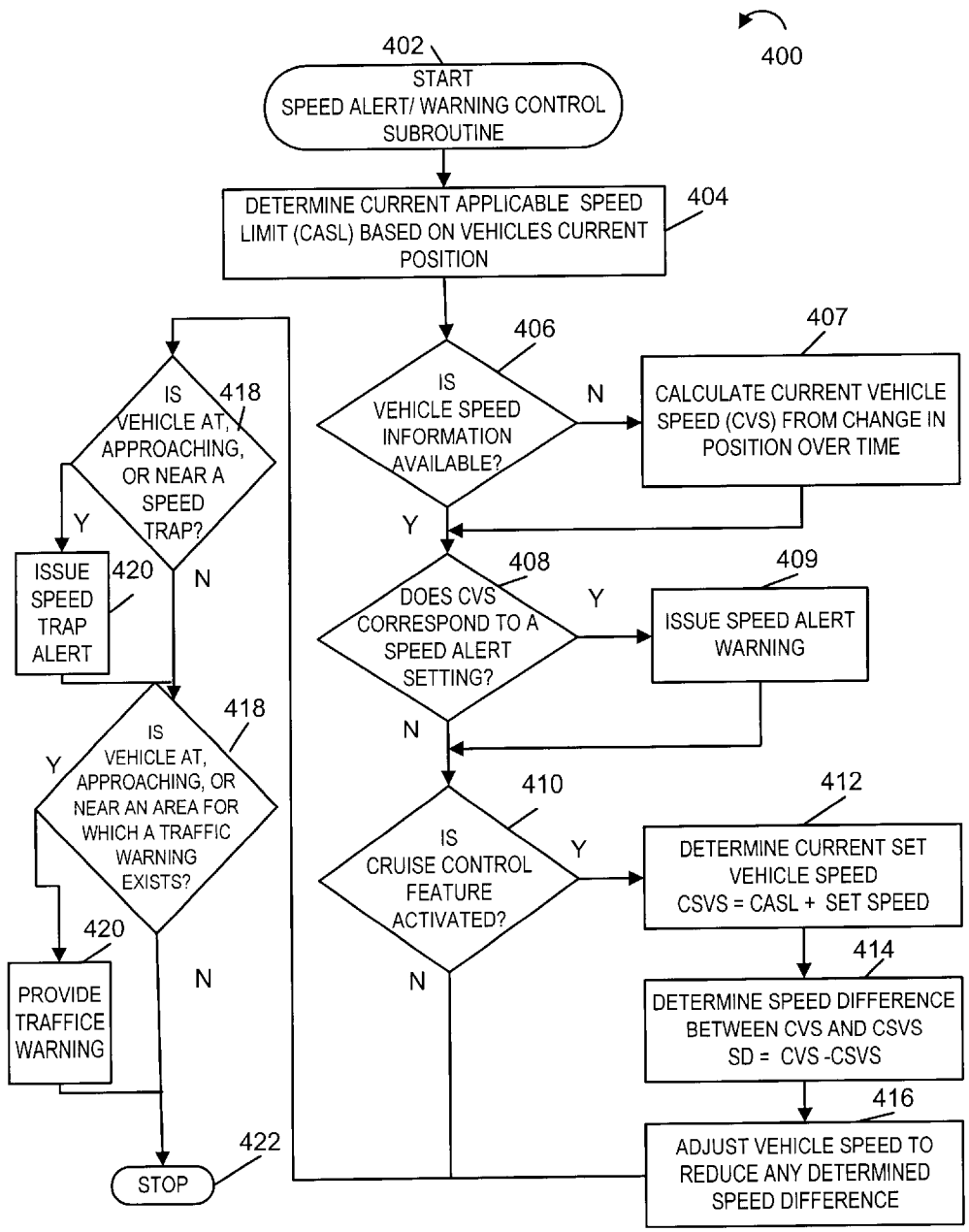
FIG. 4 illustrates speed alert/warning control subroutine suitable which may be called by the main control routine illustrated in FIG. 3.

The speed adjustment technique employed in the FIG. 4 embodiment works particularly well when traveling from an area with a lower speed limit to an area with a higher speed limit. However, when traveling from an area with a high speed limit to an area with a low speed limit it may be desirable to begin reducing speed before actually entering the area having the lower speed limit. In one particular embodiment a look-ahead feature is employed to predict entry into an area with a lower speed limit and to begin reducing speed prior to entry into the area with the lower speed limit. In one such embodiment, the vehicles direction of travel is determined from changes in GPS position information and the area to be entered in the near future, e.g., next few seconds, is predicted e.g., based on direction and speed. A check is made as to the applicable speed limit in the area to be entered. In accordance with the look ahead feature of the present invention, the speed limit in the area to be entered is compared to the CASL. If it is lower than the CASL, in step 414, the speed difference is determined based on the speed limit in the area to be entered rather than the CSVL. As a result, the speed difference will be such that the vehicle's speed is likely to be reduced in step 416 to take into account the reduced speed limit to be encountered. In such an embodiment, slowing of the vehicle occurs just prior to entry into the area having the reduced speed limit thereby increasing the likelihood that the new speed limit will be complied with from the point at which it becomes applicable. This reduces the risk of law enforcement officials being able to ticket unsuspecting drivers who might not otherwise react quickly to adjust vehicle speed to reflect the new speed limit.

In step 418 a determination is made as to whether the vehicle and/or device 100 is approaching, at or near a speed trap. Direction of travel and current position information as indicated by the GPS device 112 is used to access speed trap information database 132 to make this determination. If the vehicle/device 100 is approaching, at and/or near a speed trap for which information is stored in database 132, operation proceeds from step 418 to step 419 wherein the device 100 issues a speed trap alert. This may involve audible and/or visual signals to the device user, including speech, warning the user of the potential speed trap. Operation proceeds from step 419 to step 420.

If no speed trap is detected in the vicinity of the device's current position, operation proceeds from step 418 directly to step 420. In step 420 the vehicle's current position information is used to access warning information database 131 to determine if the vehicle is at, approaching or near an area for which a traffic or other warning exists. If in step 420 it is determined that a warning exists for where the vehicle is at, near or approaching, operation proceeds to step 421 wherein the user is provided the relevant warning from database 131. If there is no warning to be provided to the user, operation proceeds directly from step 420 to step 422 wherein the speed alert/warning/control subroutine stops until being re-executed again, e.g., in response to another CALL from step 327.

Numerous variations on the above described methods and apparatus are possible without departing from the scope of the invention.

What is claimed is:

1. A control method comprising the steps of:
   determining a first speed limit, corresponding to an area to be entered, as a function of both position information and a direction of travel, from stored information indicating the legal speed limit at each of a plurality of different geographic locations;
   determining a second speed limit, corresponding to a current position as a function of said position information, from said stored information indicating the legal speed limit at each of a plurality of different geographic locations; and
   performing, when said first determined speed limit is lower than said second determined speed limit, a control operation as a function of said first determined speed limit.

2. The method of claim 1, further comprising the step of:
   obtaining said position information from a global positioning device.

3. The method of claim 2, wherein said control operation includes a speed reduction operation.

4. The method of claim 2, further comprising:
   comparing a current speed to said second speed limit; and
   alerting the user if a current speed differs from the second speed limit by a set amount, where the set amount is a negative amount resulting in notification when the current speed drops below said speed limit by the set amount.

5. The method of claim 3, further comprising the step of:
   calculating the current speed from changes in position information obtained from the global positioning device over a period of time.

6. The method of claim 3, further comprising:
   periodically updating the stored information indicating the legal speed limit by downloading update information over the Internet.

7. The method of claim 3, further comprising the step of:
   storing said set amount as a speed limit offset value.

8. The method of claim 1, wherein said first speed limit corresponds to an area about to be entered by a vehicle and wherein said control operation includes adjusting the speed of said vehicle.

9. The method of claim 1, wherein the method is further directed to generating speed trap alert notifications, the method further comprising:
   comparing position information to information on the location of known speed traps; and
   generating an alert signal when said comparing operation indicates that the current position is approaching the location of a known speed trap.

10. A method of controlling a speed of a vehicle, the method comprising:
    determining, as a function of both direction of motion and position information, first and second speed limits, the first speed limit corresponding to an area to be entered, the second speed limit corresponding to the current position of the vehicle; and
    modifying the speed of the vehicle as a function of at least one of the determined first and second speed limits.

11. The method of claim 10, wherein said modifying includes reducing the speed of the vehicle when said first speed limit is lower than said second speed limit.

12. The method of claim 11, further comprising:
    receiving said position information from a global positioning system device;
    determining a speed set relative to the second determined speed limit as a function of the second determined speed limit and a stored speed offset value; and
    wherein the step of modifying the speed of the vehicle includes:
      comparing the speed set relative to the second determined speed limit to a current speed of the vehicle; and
      controlling the speed of the vehicle to reduce any difference between the speed set relative to the applicable speed limit and the current speed of the vehicle.

13. The method of claim 12, further comprising the step of:
    determining the current speed of the vehicle from changes in position information over time.

14. The method of claim 11, further comprising the step of:
    updating the stored legal speed limit information using speed limit information received over the Internet.

15. The method of claim 11 further comprising:
    accessing stored information indicating a speed at which a user has requested to receive a speed alert; and
    comparing the speed of the vehicle to a speed at which the user has requested a speed alert; and
    providing a speed alert to the user when the speed of the vehicle matches a speed at which the user has requested to receive a speed alert.

16. A vehicle speed control system, comprising:
    a database of legal speed limit information;
    a global positioning device for indicating the position of the vehicle;
    means for determining from the database of speed limit information the legal speed limit that will be applicable to the vehicle upon entry into an area in the direction of vehicle travel based on the vehicle's current location as indicated by the global positioning device and the direction of vehicle travel, said means for determining being able to determine the legal speed limit that will be applicable when said legal speed limit that will be applicable differs from a speed limit that is applicable to the vehicle at its current location; and cruise control circuitry for controlling the speed of the vehicle as a function of the determined legal speed limit.

17. A vehicle speed control system, comprising:

a database of legal speed limit information;

a global positioning device for indicating the position of the vehicle;

means for accessing the database of speed limit information as a function of position information provided by the global positioning device to determine the legal speed limit applicable to the vehicle based on its current location; and cruise control circuitry for controlling the speed of the vehicle as a function of the determined legal speed limit;

means for predicting when the vehicle is about to enter an area having a lower legal speed limit than the current determined legal speed limit; and means for controlling the cruise control circuitry to reduce the speed of the vehicle as a function of the lower legal speed limit.

18. A method of controlling the speed of a vehicle, the method comprising:

determining the position of the vehicle;

determining from a database of speed limit information the current applicable speed limit based on the determined position of the vehicle;

determining from said database of speed limit information the applicable speed limit of an area to be entered by said vehicle; and automatically controlling the speed of the vehicle as a function of the determined applicable speed limit of the area to be entered when the speed limit of the area to be entered is less than the current applicable speed limit.

19. The method of claim 18, repeating each of the recited steps of claim 18, the step of automatically controlling the speed of the vehicle including reducing the speed limit of said vehicle prior to entering said area to be entered by said vehicle when the speed limit of the area to be entered is less than the current applicable speed limit.

* * * * *